United States Patent
Jeong et al.

(10) Patent No.: US 8,535,826 B2
(45) Date of Patent: Sep. 17, 2013

(54) RECHARGEABLE LITHIUM BATTERY (75) Inventors: Hye-Sun Jeong, Yongin-si (KR);
Jun-Kyu Cha, Yongin-si (KR);
Seung-Hun Han, Yongin-si (KR);
Kwi-Seok Choi, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 137 days.

(21) Appl. No.: 13/220,962

(22) Filed: Aug. 30, 2011

(65) Prior Publication Data
US 2012/0107667 A1 May 3, 2012

(30) Foreign Application Priority Data
Oct. 28, 2010 (KR) .................. 10-2010-0106116

(51) Int. Cl.
*H01M 2/16* (2006.01)
*H01M 2/18* (2006.01)

(52) U.S. Cl.
USPC ............ 429/142; 429/144; 429/247; 429/254

(58) Field of Classification Search
None
See application file for complete search history.

(56) References Cited

U.S. PATENT DOCUMENTS

| | | | |
|---|---|---|---|
| 6,627,346 B1 * | 9/2003 | Kinouchi et al. | 429/144 |
| 6,905,796 B2 | 6/2005 | Ishida et al. | |
| 7,445,735 B2 | 11/2008 | Miller et al. | |
| 7,709,140 B2 * | 5/2010 | Hennige et al. | 429/145 |
| 2003/0180370 A1 | 9/2003 | Lesniak et al. | |
| 2006/0046138 A1 * | 3/2006 | Hennige et al. | 429/142 |
| 2007/0082261 A1 * | 4/2007 | Lee | 429/144 |
| 2007/0122694 A1 | 5/2007 | Yamaki et al. | |
| 2008/0248381 A1 * | 10/2008 | Hennige et al. | 429/129 |
| 2010/0112349 A1 | 5/2010 | Su et al. | |
| 2010/0279117 A1 | 11/2010 | Gu et al. | |
| 2010/0285358 A1 | 11/2010 | Cui et al. | |
| 2010/0297502 A1 | 11/2010 | Zhu et al. | |
| 2010/0310965 A1 | 12/2010 | Nakai et al. | |
| 2012/0003546 A1 * | 1/2012 | Han et al. | 429/252 |

FOREIGN PATENT DOCUMENTS

| | | |
|---|---|---|
| JP | 10255807 A | 9/1998 |
| JP | 2000-012081 A | 1/2000 |
| JP | 2002-025531 A | 1/2002 |
| KR | 10-2007-0085740 A | 8/2007 |
| KR | 10-2008-0037213 A | 4/2008 |
| KR | 10-2009-0084203 A | 8/2009 |

* cited by examiner

*Primary Examiner* — John S Maples
(74) *Attorney, Agent, or Firm* — Robert E. Bushnell, Esq.

(57) ABSTRACT

A rechargeable lithium battery includes a positive electrode including a positive active material; a negative electrode including a negative active material; an electrolyte including a lithium salt and a non-aqueous organic solvent; and a separator interposed between the positive and negative electrodes and including a ceramic material having a first metal oxide-containing core and a second metal oxide shell disposed on the surface of the core.

14 Claims, 3 Drawing Sheets

RECHARGEABLE LITHIUM BATTERY

CLAIM OF PRIORITY

This application makes reference to, incorporates the same herein, and claims all benefits accruing under 35 U.S.C. 119 from an application for RECHARGEABLE LITHIUM BATTERY earlier filed in the Korean Intellectual Property Office on 28 Oct. 2010 and there duly assigned Serial No. 10-2010-0106116.

BACKGROUND OF THE INVENTION

1. Field of the Invention

The present invention relates to a rechargeable lithium battery, and more particularly, to a rechargeable lithium battery having a separator interposed between positive and negative electrodes including a ceramic material.

2. Description of the Related Art

Rechargeable Lithium batteries have recently drawn attention as a power source for small portable electronic devices. Since the rechargeable lithium batteries use an organic electrolyte solution, rechargeable lithium batteries have twice the discharge voltage of conventional batteries which use an alkali aqueous solution. Accordingly, the rechargeable lithium batteries have a higher energy density.

Such a rechargeable lithium battery includes a positive electrode including a positive active material, a negative electrode including a negative material, and an electrolyte. As for positive active materials for a positive electrodes, oxides including lithium and transition elements capable of intercalating lithium ions, such as $LiCoO_2$, $LiMn_2O_4$, $LiNi_{1-x}Co_xO_2$ (0<x<1), and the like have been used.

As for negative active materials for negative electrodes, diverse carbon-based materials capable of intercalating and deintercalating lithium ions such as artificial graphite, natural graphite, and hard carbon, or non-carbon-based materials such as silicon, tin oxide, lithium vanadium-based oxide, and the like have been used.

A separator is positioned between positive and negative electrodes to separate the positive and negative electrodes, and such a separator is an electrically insulating polymer film made of polyethylene, polypropylene, and the like.

SUMMARY OF THE INVENTION

One or more embodiments of the present invention provide a rechargeable lithium battery having high-capacity and excellent safety and reliability.

According to one embodiment of the present invention, a rechargeable lithium battery is provided that a positive electrode including a positive active material; a negative electrode including a negative active material; an electrolyte including a lithium salt and a non-aqueous organic solvent; and a separator interposed between the positive and negative electrodes and the separator includes a ceramic material including a first metal oxide-containing core and a second metal oxide shell disposed on the surface of the core.

The first metal oxide may include $SiO_2$, $Al_2O_3$, or a combination thereof.

The second metal oxide may be MgO, $V_2O_5$, $WO_3$, or a combination thereof.

The second metal oxide shell may have a thickness of about 1 nm to about 3 μm.

The first metal oxide core may have a size ranging from about 1 nm to about 7 μm.

The ceramic material may have an entire size ranging from about 2 nm to about 10 μm.

The first metal oxide core and the second metal oxide shell may be present at a weight ratio ranging from about 9:1 to about 8:2.

The separator may include a pore. The pore may have an average width ranging from about 0.01 μm to about 0.1 μm and an average length ranging from 0.05 μm to 0.15 μm.

The separator may be about 1 μm to about 25 μm thick.

In addition, the separator may include a polymer film coated with the ceramic materials on both sides of the polymer film.

The polymer film may comprise a polymer including polyethylene, polypropylene, or a combination thereof.

The ceramic material may be coated on the polymer film forming a ceramic coating layer, the ceramic coating layer is about 1 nm to about 3 μm thick.

According to one embodiment of the present invention, since a separator is lighter and thinner, it may accomplish high-capacity of a rechargeable lithium battery. In addition, the separator according to one embodiment of the present invention may improve ion conductivity of a rechargeable lithium battery compared with a conventional polymer separator and decrease internal resistance. The separator may also minimize thermal shrinkage during the overheating of the rechargeable lithium battery and thus, has excellent reliability and provide the rechargeable lithium battery with very stable performance and strong sputtering resistance. Furthermore, the separator may include a pore with an area and a size regulated by controlling ceramic particles and thus, optimize a rechargeable battery.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The general inventive concept is hereinafter described in detail with reference to the accompanying drawings. As those skilled in the art would realize, the described embodiments may be modified in various different ways, all without departing from the spirit or scope of the present invention. These embodiments are only exemplaries, and the present invention is not limited thereto. Accordingly, the drawings and description are to be regarded as illustrative in nature to explain aspects of the present invention.

A rechargeable lithium battery according to one embodiment of the present invention includes a positive electrode including a positive active material; a negative electrode including a negative active material; an electrolyte including a lithium salt and a non-aqueous organic solvent; and a separator interposed between the positive and negative electrodes and having a ceramic material including a first metal oxide-containing core and a second metal oxide shell disposed on the surface of the core.

In a rechargeable lithium battery according to one embodiment of the present invention, a separator may include a polymer film coated with the ceramic material on both sides of the polymer film.

The first metal oxide may include $SiO_2$, $Al_2O_3$, or a combination thereof. The first metal oxide may include either $SiO_2$ or $Al_2O_3$ or a mixture thereof. These $SiO_2$ and $Al_2O_3$ may be mixed in a weight ratio ranging from 1:9 to 9:1. When the $SiO_2$ and $Al_2O_3$ are mixed within the above range of weight ratio, the ceramic mixture may bring suitable effects to a separator.

The second metal oxide may be MgO, $V_2O_5$, $WO_3$, or a combination thereof and particularly, MgO. The second metal oxide has very excellent ion conductivity and may decrease internal resistance of a rechargeable lithium battery, resultantly improving the power of the rechargeable lithium battery.

The polymer film may include a polymer including polyethylene, polypropylene, or a combination thereof.

When the ceramic material is coated on a polymer film forming a ceramic coating layer, the ceramic coating layer may be about 1 nm to about 3 µm thick.

In this way, a rechargeable lithium battery according to one embodiment of the present invention may include a separator including a ceramic material. Since the ceramic material includes a core-shell structure having a first metal oxide as a core, which has very excellent ion conductivity, but may be easily dissolved in an electrolyte, is surrounded by a second metal oxide as a shell which is not well-dissolved in the electrolyte, the separator may works for a long time with an excellent ion-conductivity.

The core-shell structure may provide smaller and thinner separator than the conventional separator, so that the separator according to one embodiment of the present invention may provide a rechargeable lithium battery exhibiting high capacity. Furthermore, the first metal oxide-containing core makes it to minimize the thermal shrinkage during the over-heating of the rechargeable lithium battery and gives the high sputtering resistance to the rechargeable lithium battery. The second metal oxide shell may absorb moisture so that the separator according to one embodiment of the present invention may be useful for fabricating the rechargeable lithium battery.

According to one embodiment of the present invention, a separator may be made of either a ceramic material or a polymer film coated by the ceramic material on both sides of the polymer film.

When a separator is made of a ceramic material, the separator may become lighter and thinner than a conventional polymer separator such as polyethylene, polypropylene, and the like. On the other hand, when a separator is made of a polymer film coated with a ceramic material on both sides of the polymer film, the separator may have less heat generated during the charge and discharge, suppress a thermal contraction problem, and promote transportation of lithium ions.

In the core-shell structure of the ceramic material, the shell may have a thickness ranging from about 1 nm to about 3 µm. When the shell has a thickness within the above range, the shell may effectively prevent the core from directly contacting with an electrolyte. On the other hand, the core may have a size ranging from about 1 nm to about 7 µm. Resultantly, the ceramic material may have an entire size ranging from about 2 nm to about 10 µm.

The core and the shell may have a weight ratio ranging from about 9:1 to about 8:2. When the core and the shell have a weight ratio within the above range, a separator including the ceramic material may have improved ion conductivity and thus, a rechargeable lithium battery has decreased internal resistance and minimum thermal contraction and high reliability characteristics when the battery is over-heated. Accordingly, a separator including the ceramic material may have stability and strong resistance on sputtering by ion collision so that the separator may provide a rechargeable lithium battery with excellent cycle life characteristics and no short circuit.

In a rechargeable lithium battery according to one embodiment of the present invention, a separator including a ceramic material with the core-shell structure may include a pore. Herein, this pore may have an average width ranging from about 0.01 µm to about 0.1 µm and an average length ranging from about 0.05 µm to about 0.15 µm. When a pore has a size within the aforementioned range of the average width and average length, lithium ions may be more actively transferred therein providing a rechargeable lithium battery with high-capacity.

A separator may have a thickness ranging from about 1 µm to about 25 µm. When a separator is made of a ceramic material with a core-shell structure, the separator may have a thickness ranging from about 1 µm to about 10 µm. When a separator is made of a polymer film coated with a ceramic material with a core-shell structure on both sides of the polymer film, the separator may have a thickness ranging from about 10 µm to about 25 µm.

When the separator has a thickness within the above range, it may much improve thermal stability of rechargeable lithium batteries.

In this way, since a separator according to one embodiment of the present invention is thin, a rechargeable lithium battery may relatively include large amount of active material and achieve high-capacity.

In a rechargeable lithium battery according to one embodiment of the present invention, a ceramic material with a core-shell structure may include any core-shell structures known in a related art.

A ceramic material with a core-shell structure is coated on a surface of a positive electrode or a negative electrode, or on both surfaces of positive and negative electrodes to dispose a ceramic-containing coating layer. Herein, the ceramic-containing coating layer may be formed by a wet or a dry method. The wet method may include screen printing, table-coater, spin-coater, and the like, while the dry method may include electron beam deposit, ion plating, magnetron sputtering, and the like.

The wet method may be performed by using a ceramic liquid prepared by adding a ceramic material to a solvent. Herein, the solvent may include N-methylpyrrolidone, methylethylketone, dimethyl acetamide, or a combination thereof. In addition, the ceramic liquid may further include a binder. Herein, the binder may include polyvinylidene fluoride and the like but is not limited thereto. A content of a solid part in the ceramic liquid may be in the range of about 5 to about 50 wt %. When the ceramic liquid further includes a binder, the ceramic and the binder are mixed in a weight ratio ranging from 60:40 to 30:70 wt %.

In this way, a ceramic-containing coating layer disposed on an electrode by this method may be used as a separator to fabricate a rechargeable lithium battery without a polymer separator.

Next, an electrode having a ceramic-containing coating layer (may be also used as a ceramic separator) prepared by the above methods is impregnated in an electrolyte and then, used to fabricate a rechargeable lithium battery. When a ceramic-containing coating layer is first impregnated in an electrolyte, that is, pores of the ceramic-containing coating layer are impregnated in the electrolyte, a rechargeable lithium battery may have more active charge and discharge reaction. In addition, since a separator according to one embodiment of the present invention may be made of a ceramic material or a polymer film coated by a ceramic material on both sides of the polymer film (as a result, a ceramic-containing coating layer is formed on the polymer film), an electrolyte may be faster permeated in the separator than a conventional polymer separator. Furthermore, the separator may include no vapor despite permeated in the electrolyte.

In a rechargeable lithium battery according to one embodiment of the present invention, a positive electrode includes a current collector and a positive active material layer including a positive active material disposed on the current collector.

The positive active material may include lithiated intercalation compounds that reversibly intercalate and deintercalate lithium ions. Examples of the positive active materials include a composite oxide including at least one selected from the group consisting of cobalt, manganese, and nickel, as well as lithium. In one embodiment, the following lithium-containing compounds may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{3-f}Fe_2(PO_4)_3$ ($0 \leq f \leq 2$); and $Li_aFePO_{4-\alpha}T_\alpha$ ($0.90 \leq a \leq 1.8$, $0 \leq \alpha \leq 4$).

In the above Chemical Formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The positive active material may include either the positive active material with a coating layer, or a compound of the positive active material and the positive active material coated with a coating layer. The coating layer may include at least one coating compound selected from the group consisting of an oxide of a coating element, a hydroxide of a coating element, an oxyhydroxide of a coating element, an oxycarbonate of a coating element, and a hydroxycarbonate of a coating element. The coating compound for the coating layer may be either amorphous or crystalline. The coating element included in the coating layer may be selected from the group consisting of Mg, Al, Co, K, Na, Ca, Si, Ti, V, Sn, Ge, Ga, B, As, Zr, and combinations thereof. The coating processes may include any conventional processes as long as it does not causes any side effects on the properties of the positive active material (e.g., spray coating, immersing), which are well known to persons having ordinary skill in this art. Accordingly, a detailed description thereof is omitted.

In the positive active material layer, the positive active material may be included in an amount of about 90 wt % to about 98 wt % based on the total weight of the positive active material layer.

The positive active material layer may include a binder or a conductive material. The binder and the conductive material may be included in amounts of 1 wt % to 5 wt % based on the total weight of the positive active material layer, respectively.

The binder improves binding properties of the positive active material particles with each other and binding properties of the positive active material particles with a current collector. Examples of the binders include at least one selected from the group consisting of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, a styrene-butadiene rubber, an acrylated styrene-butadiene rubber, an epoxy resin, nylon, and the like, but is not limited thereto.

The conductive material improves electrical conductivity of a positive electrode. Any electrical conductive material may be used in the present invention as a conductive material unless it causes a chemical change. Examples of the conductive materials include a carbon-based material such as natural graphite, artificial graphite, carbon black, acetylene black, ketjen black, a carbon fiber, and the like; a metal-based material including a metal powder or a metal fiber of copper, nickel, aluminum, silver, and the like; a conductive polymer such as polyphenylene derivative; or a mixture thereof.

The current collector for positive electrode may include Al, but is not limited thereto.

In a rechargeable lithium battery according to one embodiment of the present invention, a negative electrode includes a current collector and a negative active material layer including a negative active material disposed on the current collector.

The negative active material may includes a material capable of reversibly intercalating/deintercalating lithium ions, a lithium metal, or a lithium metal alloy, a material capable of doping and dedoping lithium, or a transition metal oxide.

The material capable of reversibly intercalating/deintercalating lithium ions, a lithium metal, or a lithium metal alloy may include any carbonaceous material, which includes any carbonaceous negative active material generally used for a rechargeable lithium battery. The representative example of carbonaceous material may include crystalline carbon, amorphous carbon, or a mixture thereof. Examples of the crystalline carbon include graphite such as amorphous, sheet-type, flake-type, spherical, or fibrous natural graphite or artificial graphite, and examples of the amorphous carbon include soft carbon or hard carbon, mesophase pitch carbonized materials, and fired coke.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x(0 \leq x \leq 2)$, a Si-Q alloy (where Q is an element selected from the group consisting of an alkaline metal, an alkaline-earth metal, a group 13 element, a group 14 element, a group 15 element of the Periodic Table, a group 16 element, a transition element, a rare earth element, and combinations thereof, and is not Si), Sn, $SnO_2$, a Sn-T alloy (where T is an element selected from the group consisting of an alkaline metal, an alkaline-earth metal, a group 13 element, a group 14 element, a group 15 element, a group 16 element, a transition element, a rare earth element, and combinations thereof, and is not Sn), and mixtures thereof. At least one of these materials may be mixed with $SiO_2$. The elements Q and T are the same or different, and are independently selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, oxide of the following Chemical Formula 1, or lithium titanium oxide.

$$Li_{x1}M'_{y1}V_{2-y1}O_{6-z1} \quad \text{[Chemical Formula 1]}$$

In Chemical Formula 1, $0 \leq x1 \leq 1.2$, $0 \leq y1 \leq 2$, $-2 \leq z1 \leq 2$, and M' is Mo, Mn, Co, Ni, or a combination thereof.

In the negative active material layer, the negative active material may be included in an amount of about 95 wt % to about 99 wt % based on the total weight of the negative active material layer.

The negative active material layer may include a binder, and may optionally further include a conductive material. The negative active material layer may include in an amount of about 1 wt % to about 5 wt % of a binder based on the total weight of the negative active material layer. In addition, when the negative active material layer further includes a conductive material, the negative active material layer may include in an amount of about 90 wt % to about 98 wt % of the negative active material, in an amount of about 1 wt % to about 5 wt % of the binder, and in an amount of about 1 wt % to about 5 wt % of the conductive material.

The binder improves properties for binding negative active material particles with one another and for binding negative active material particles with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and a combination thereof.

Examples of the water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth) acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts by weight of the negative active material.

The conductive material is included to improve electrical conductivity of a negative electrode. Any electrical conductive material may be used in the present invention as a conductive material unless it causes a chemical change. Examples of the conductive material include carbon-based material such as natural graphite, artificial graphite, carbon black, acetylene black, ketjen black, carbon fiber, and the like; a metal-based material including a metal powder or a metal fiber including copper, nickel, aluminum, silver, and the like; a conductive polymer such as polyphenylene derivative, and the like; or a mixture thereof.

The current collector for negative electrode includes a copper foil, a nickel foil, a stainless steel foil, a titanium foil, a nickel foam, a copper foam, a polymer substrate coated with a conductive metal, or combinations thereof.

The negative and positive electrodes may be fabricated by a method including mixing the active material and a binder, and optionally a conductive material to provide an active material composition, and coating the active material composition on a current collector. The electrode manufacturing method is well known, and thus is not described in detail in the present specification. The solvent includes N-methylpyrrolidone and the like, but is not limited thereto. When a water-soluble binder is used in a negative electrode, water may be used as a solvent during preparation of a negative active material composition.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based solvent, an ester-based solvent, an ether-based solvent, a ketone-based solvent, an alcohol-based solvent, or an aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethyl acetate, methylpropionate, ethylpropionate, γ-butyrolactone, decanolide, valerolactone, mevalonolactone, caprolactone, or the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone or the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the non-aqueous organic solvent is used in a mixture, the mixture ratio may be controlled in accordance with desirable battery performance.

The carbonate-based solvent may be prepared by mixing a cyclic carbonate and a linear carbonate. In this case, the cyclic carbonate may be mixed with the linear carbonate in an appropriate mixing ratio, and for example, they may be mixed in a volume ratio ranging from about 1:1 to about 1:9, but is not limited thereto.

In addition, the non-aqueous organic solvent may prepared by mixing a carbonate-based solvent with an aromatic hydrocarbon-based solvent. The carbonate-based solvent may be mixed with the aromatic hydrocarbon-based organic solvent in a volume ratio of about 1:1 to about 30:1.

The aromatic hydrocarbon-based solvent may be represented by the following Chemical Formula 2.

[Chemical Formula 2]

In Chemical Formula 2, $R_1$ to $R_6$ are independently selected from the group consisting of hydrogen, a halogen, a C1 to C10 alkyl group, a C1 to C10 haloalkyl group, or a combination thereof.

The aromatic hydrocarbon-based solvent may include, but is not limited to, at least one selected from the group consisting of benzene, t-butylbenzene, t-pentylbenzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte including a non-aqueous organic solvent may further include an additive of vinylene carbonate, or an ethylene carbonate-based compound represented by the following Chemical Formula 3 in order to improve cycle-life of rechargeable lithium batteries.

[Chemical Formula 3]

In Chemical Formula 3, $R_7$ and $R_8$ are independently selected from the group consisting of hydrogen, a halogen, a cyano group (CN), a nitro group ($NO_2$), and a C1 to C5 fluoroalkyl group, preferably, at least one of $R_7$ and $R_8$ is selected from the group consisting of a halogen, a cyano group (CN), a nitro group ($NO_2$), and a C1 to C5 fluoroalkyl group, and both $R_7$ and $R_8$ are not hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. The amount of the additive used to improve cycle life of rechargeable lithium batteries may be adjusted within an appropriate range.

The lithium salt in electrolyte is dissolved in an organic solvent, supplies lithium ions in a rechargeable lithium battery, operates basic operations of a rechargeable lithium battery, and improves lithium ion transport between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x-1}SO_2)(C_yF_{2y+1}SO_2)$ (where x and y are natural numbers), $LiCl$, $LiI$, and $LiB(C_2O_4)_2$ (lithium bisoxalato borate, LiBOB). The lithium salt may be used in a concentration ranging from about 0.1 M to about 2.0 M. When the lithium salt is included at the above concentration range, electrolyte performance and lithium ion mobility may be enhanced due to optimal electrolyte conductivity and viscosity.

The rechargeable lithium battery may further include a polymer separator between the negative electrode and the positive electrode, as needed. Examples of suitable polymer separator materials include polyethylene, polypropylene, polyvinylidene fluoride, and multi-layers thereof. Examples of the multi-layers are a polyethylene/polypropylene double-layered separator, a polyethylene/polypropylene/polyethylene triple-layered separator, and a polypropylene/polyethylene/polypropylene triple-layered separator.

Figure 1:
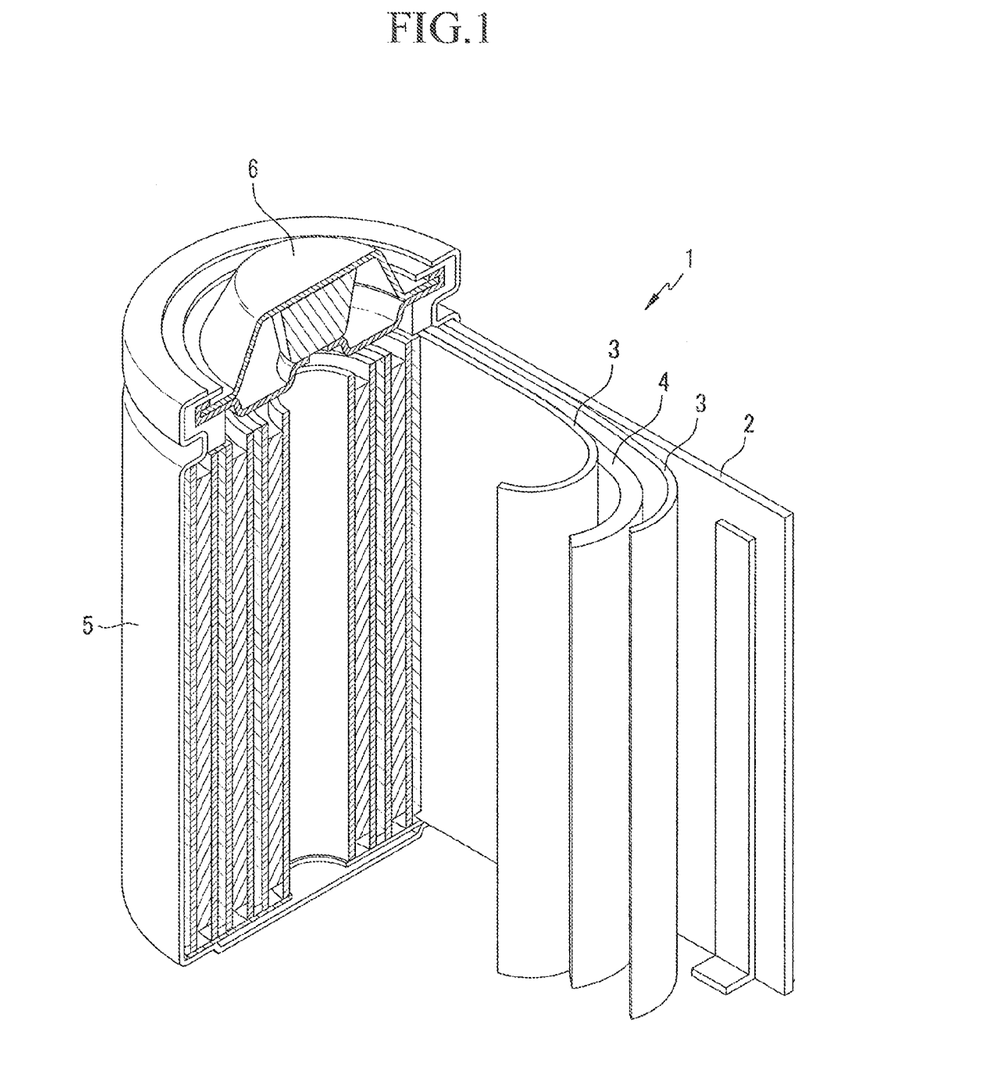
FIG. 1 is a schematically cross-sectional view of a rechargeable lithium battery according to one embodiment of present invention.

FIG. 1 is a schematically cross-sectional view of a rechargeable lithium battery according to one embodiment of the present invention. Although FIG. 1 shows a prismatic rechargeable lithium battery, the rechargeable lithium battery according to the present invention is not limited thereto. The rechargeable lithium battery may have any shape such as cylindrical-type, coin-type, or pouch-type, as long as it may be operated as a battery. As shown in FIG. 1, the rechargeable lithium battery 1 includes a battery case 5, the battery case 5 encompasses a negative electrode 2, a positive electrode 4, a separator 3 interposed between the negative electrode 2 and the positive electrode 4, and an electrolyte solution impregnated therein. A sealing member 6 seals the battery case 5.

The following examples illustrate the present invention in more detail. These examples, however, are not in any sense to be interpreted as limiting the scope of the disclosure.

Comparative Example 1

A rechargeable lithium battery cell was fabricated using an about 25 μm-thick polyethylene as a separator, a positive electrode, a negative electrode, and electrolyte solution in a common method.

The positive electrode was fabricated by mixing 92 wt % of a $LiNi_{0.5}CO_{0.2}Mn_{0.3}O_2$ positive active material, 4 wt % of a polyvinylidene fluoride binder, 4 wt % of a ketjen black conductive material in an N-methylpyrrolidone solvent to prepare positive active material slurry, coating this slurry on an Al current collector, and drying and compressing the coated current collector in a common process.

The negative electrode was fabricated by mixing 96.5 wt % of a graphite negative active material, 3 wt % of a polyvinylidene fluoride binder, and 0.5 wt % of a ketjen black conductive material in an N-methylpyrrolidone solvent to prepare negative active material slurry, coating this slurry on a Cu current collector, and drying and compressing the coated current collector in a common method.

The electrolyte solution was prepared by adding 5 volume % of fluoroethyl carbonate, 1 volume % of vinylethyl carbonate, and 1 volume % of succinonitrile to 100 volume % of a mixture of ethylene carbonate, ethylmethyl carbonate, and dimethyl carbonate (a volume ratio of 2:2:6) including 1M $LiPF_6$ dissolved therein.

Example 1

A ceramic liquid was prepared by adding a ceramic material including an $Al_2O_3$ core and a MgO shell and a polyvinylidene binder in a weight ratio of 50 wt %:50 wt % to an N-methylpyrrolidone solvent. Herein, a solid part of $Al_2O_3$ and MgO in the ceramic liquid was 10 wt %. The ceramic material included an $Al_2O_3$ core and a MgO shell in a weight ratio of 9:1. The MgO shell was 1 μm thick. The $Al_2O_3$ core was 9 μm thick. In addition, the ceramic material had an entire size of 10 μm and included a pore with an average width of 0.07 μm and an average length of 0.1 μm.

Next, the ceramic liquid was coated on one side of a positive electrode by a screen printing method, forming a 10 μm-thick ceramic separator. The positive electrode was the same as prepared in the aforementioned process in the Comparative Example 1. Then, the positive electrode having the 10 μm-thick ceramic separator on the surface was impregnated in an electrolyte solution. The electrolyte solution was the same as prepared in the Comparative Example 1.

Then, the positive electrode having the 10 μm-thick ceramic separator on the surface and impregnated in the electrolyte solution, a negative electrode, and the electrolyte solution were used together to fabricate a rechargeable lithium battery cell in a common method. The negative electrode was the same as prepared in the Comparative Example 1.

The rechargeable lithium battery cells according to Example 1 and Comparative Example 1 were 100 times charged and discharged with 1.0 C and then, measured regarding discharge capacity. The results are provided in FIG. 2.

Figure 2:
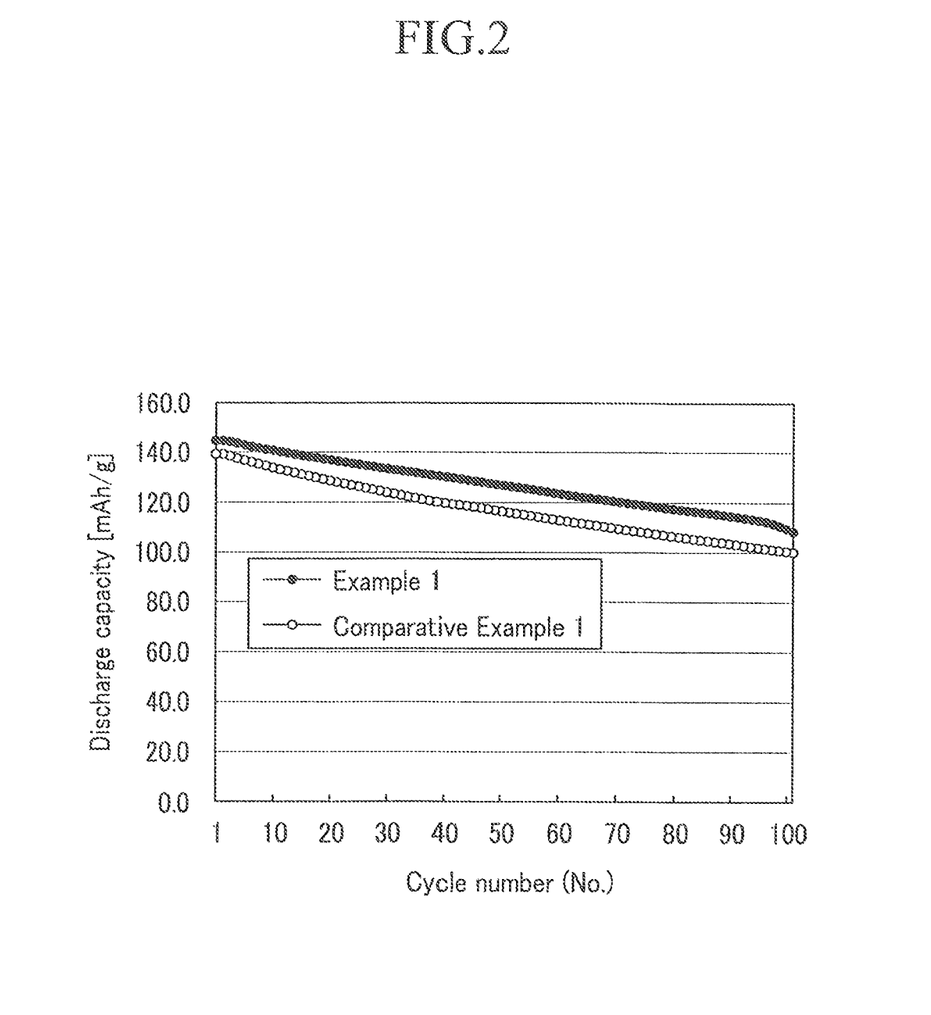
FIG. 2 is a discharge capacity graph by 100 times charging and discharging rechargeable lithium batteries according to Example 1 and Comparative Example 1 with 1.0 C.

As shown in FIG. 2, the rechargeable lithium battery cell including a thinner ceramic separator according to Example 1 had higher capacity than the one according to Comparative Example 1. When the rechargeable lithium battery cell according to Example 1 was 100 times charged and discharged, it had similar capacity deterioration ratio comparing to the one according to Comparative Example 1 but maintained a high final capacity.

Figure 3:
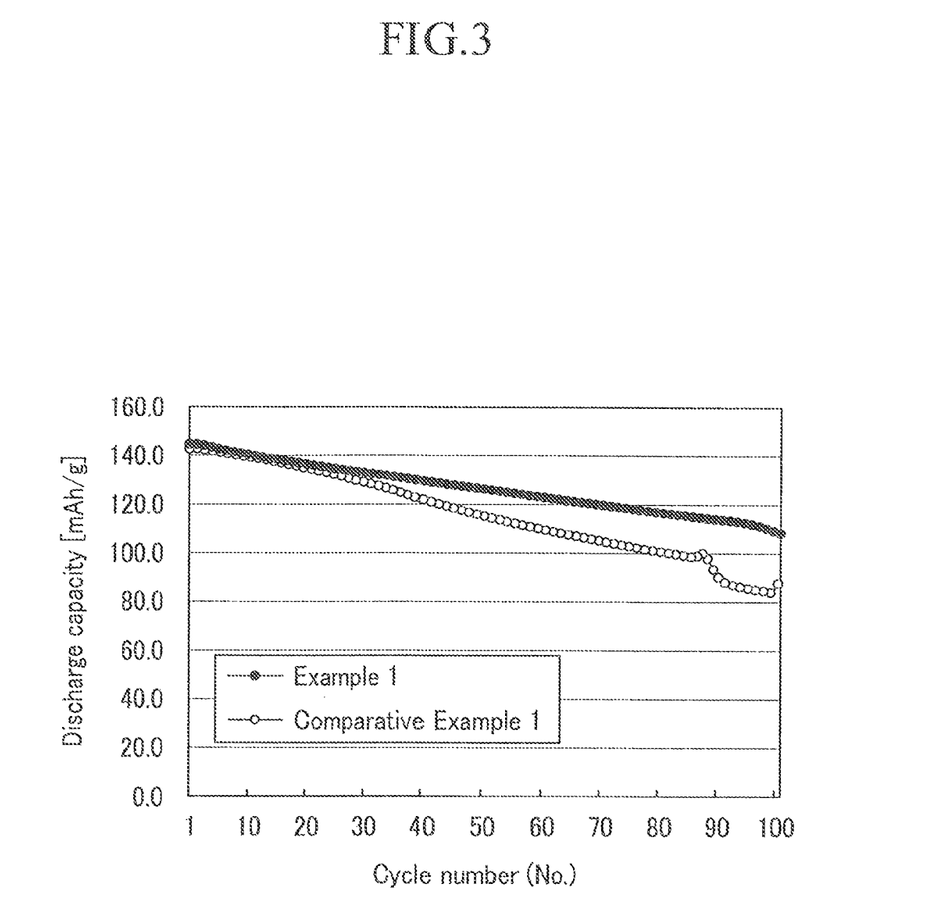
FIG. 3 is a discharge capacity graph by 100 times charging and discharging rechargeable lithium batteries according to Example 1 and Comparative Example 1 showing results of evaluations regarding high temperature stability.

The rechargeable lithium battery cells according to Example 1 and Comparative Example 1 were evaluated regarding their high temperature stabilities. The high temperature stability evaluation was performed by exposing the rechargeable lithium battery cells according to Example 1 and Comparative Example 1 at 130° C. for 2 hours and at 150° C. for 10 minutes and then, 100 times charging and discharging them with 1.0 C. The results are provided in FIG. 3.

Comparative Example 2

MgO and $SiO_2$ components were mixed in an N-methylpyrrolidone solvent in a mole ratio of 1:1, preparing a slurry having MgO and $SiO_2$ components. The slurry was coated on a positive electrode according to Example 1 to dispose a 10 μm-thick separator.

The resulting positive electrode with the 10 μm-thick separator on the surface was impregnated in an electrolyte solution. The electrolyte solution was the same as the one used in Comparative Example 1.

The rechargeable lithium battery cell according to Comparative Example 2 was charged and discharged with 1.0 C but failed in getting a discharge capacity. When the rechargeable lithium battery cell was disassembled, the separator therein was dissolved. The reason is that $SiO_2$ was dissolved due to HF produced in the electrolyte solution. As a result, the battery cell could not be used.

Example 2

A rechargeable lithium battery cell was fabricated according to the same method as Example 1 except for coating the ceramic liquid prepared in Example 1 on one side of the negative electrode prepared in the aforementioned process in the Comparative Example 1 in a screen printing method to dispose a 10 μm-thick ceramic separator and then, impregnating the coated negative electrode in an electrolyte solution. The electrolyte solution was the same as prepared in the Comparative Example 1.

Example 3

A rechargeable lithium battery cell was fabricated according to the same method as Example 1 except for coating the ceramic liquid prepared in Example 1 on one side of a positive electrode and on one side of a negative electrode both prepared in the aforementioned process in the Comparative Example 1 in a screen printing method to dispose a 5 μm-thick ceramic separator on both of the positive and negative electrodes, respectively and then, respectively impregnating the coated positive and negative electrodes in an electrolyte solution. The electrolyte solution was the same as prepared in the Comparative Example 1. Resultantly, the ceramic separator was entirely 10 μm thick.

Example 4

A rechargeable lithium battery cell was fabricated according to the same method as Example 1 except for coating the ceramic liquid prepared in Example 1 to be 3 μm thick on both sides of a polyethylene film with a thickness of 35 μm in a screen printing method and then, impregnating the separator in an electrolyte solution.

The foregoing paragraphs describe the details for a rechargeable lithium battery having a separator interposed between positive and negative electrodes including a ceramic material providing a first metal oxide-containing core and a second metal oxide shell disposed on the surface of the core. The battery may also have a separator interposed between positive and negative electrodes including a polymer film coated with the ceramic material on both sides of the polymer film.

While the foregoing paragraphs describe the details in connection with what is presently considered to be practical exemplary embodiments, it is to be understood that the principle of the invention is not limited to the described embodiments. On the contrary, described embodiments are intended to cover various modifications and equivalent arrangements included within the spirit and scope of the appended claims. Therefore, the above-mentioned embodiments are exemplary but do not limit in any sense.

What is claimed is:
1. A rechargeable lithium battery, comprising
a positive electrode including a positive active material;
a negative electrode including a negative active material;
an electrolyte including a lithium salt and a non-aqueous organic solvent; and a separator interposed between the positive and negative electrodes and the separator comprises a ceramic material including a first metal oxide-containing core and a second metal oxide shell disposed on the surface of the core.

2. The rechargeable lithium battery of claim 1, wherein the first metal oxide comprises $SiO_2$, $Al_2O_3$, or a combination thereof.

3. The rechargeable lithium battery of claim 1, wherein the second metal oxide comprises MgO, $V_2O_5$, $WO_3$, or a combination thereof.

4. The rechargeable lithium battery of claim 1, wherein the shell has a thickness of about 1 nm to about 3 μm.

5. The rechargeable lithium battery of claim 1, wherein the core has a size ranging from about 1 nm to about 7 μm.

6. The rechargeable lithium battery of claim 1, wherein the ceramic material has an size ranging from about 2 nm to about 10 μm.

7. The rechargeable lithium battery of claim 1, wherein the core and the shell are present at a weight ratio of about 9:1 to about 8:2.

8. The rechargeable lithium battery of claim 1, wherein the separator comprises a pore.

9. The rechargeable lithium battery of claim 1, wherein the pore in the separator has an average width ranging from about 0.01 μm to about 0.1 μm and an average length ranging from about 0.05 μm to about 0.15 μm.

10. The rechargeable lithium battery of claim 1, wherein the separator has a thickness ranging from about 1 μm to about 25 μm.

11. The rechargeable lithium battery of claim 1, wherein the separator further comprises a polymer film coated with the ceramic material on both sides of the polymer film.

12. The rechargeable lithium battery of claim 11, wherein the separator has a thickness ranging from about 1 μm to about 25 μm.

13. The rechargeable lithium battery of claim 11, wherein the polymer film comprises a polymer including polyethylene, polypropylene, or a combination thereof.

14. The rechargeable lithium battery of claim 11, when the ceramic material is coated on the polymer film forming a ceramic coating layer, the ceramic coating layer is about 1 nm to about 3 μm thick.

* * * * *